US009817559B2

(12) United States Patent
Simon et al.

(10) Patent No.: US 9,817,559 B2
(45) Date of Patent: Nov. 14, 2017

(54) PREDICTIVE FOOD LOGGING

(71) Applicant: Noom, Inc., New York, NY (US)

(72) Inventors: Mark Simon, New York, NY (US);
Betina Evancha, New York, NY (US);
Gennadiy Shafranovich, Brooklyn, NY (US); Yong Woo Kim, Seoul (KR);
Ketill Gunnarsson, Trnava (SK);
James Connell, Mechanicville, NY (US); Young In Suh, Queens, NY (US); Christos Avgerinos, Brooklyn, NY (US); Bo Yin, Mississauga (CA);
Artem Petakov, New York, NY (US);
Ken Nesmith, New York, NY (US);
Jesse Sae-ju Jeong, West New York, NJ (US)

(73) Assignee: Noom, Inc., New York, NY (US)

( * ) Notice: Subject to any disclaimer, the term of this patent is extended or adjusted under 35 U.S.C. 154(b) by 325 days.

(21) Appl. No.: 14/329,594

(22) Filed: Jul. 11, 2014

(65) Prior Publication Data

US 2016/0012342 A1   Jan. 14, 2016

(51) Int. Cl.
*G06F 9/44* (2006.01)
*G06N 7/02* (2006.01)
*G06N 7/06* (2006.01)
*G06F 3/0484* (2013.01)
*G06Q 10/00* (2012.01)

(52) U.S. Cl.
CPC ......... *G06F 3/04842* (2013.01); *G06Q 10/00* (2013.01)

(58) Field of Classification Search
USPC .......................................................... 706/52
See application file for complete search history.

(56) References Cited

U.S. PATENT DOCUMENTS 6,817,863 B2   11/2004   Bisogno
7,413,438 B2    8/2008   Bisogno
(Continued)

OTHER PUBLICATIONS

Recommendation for Repeat Consumption from User Implicit Feedback Jun Chen; Chaokun Wang; Jianmin Wang; Philip S. Yu IEEE Transactions on Knowledge and Data Engineering Year: 2016, vol. 28, Issue: 11 pp. 3083-3097, DOI: 10.1109/TKDE.2016.2593720 IEEE Journals & Magazines.*

(Continued)

*Primary Examiner* — Michael B Holmes
(74) *Attorney, Agent, or Firm* — Schwegman Lundberg & Woessner, P.A.

(57) ABSTRACT

A method of predicting food items consumed by a user of a food-logging application is disclosed. Loggings of consumptions of food items are received. A predictive model is generated based on the received loggings. The predictive model generates a prediction of one or more additional food items that a target user will consume or is likely to have consumed (e.g., at a particular time). The prediction is generated based on an application of the predictive model to one or more data items (e.g., data items streaming into the system in real time from the target user or other users that are relevant to food consumptions by the target user). The prediction of the consumption of the one or more additional food items by the user may then be communicated for presentation to the target user in a user interface.

20 Claims, 10 Drawing Sheets

(56) References Cited

U.S. PATENT DOCUMENTS

| | | | | | |
|---|---|---|---|---|---|
| 7,809,601 | B2* | 10/2010 | Shaya | | G06Q 30/02 |
| | | | | | 700/233 |
| 8,666,844 | B2* | 3/2014 | Shaya | | G06Q 30/02 |
| | | | | | 705/26.1 |
| 8,805,110 | B2* | 8/2014 | Rhoads | | G06F 17/30241 |
| | | | | | 382/255 |
| 8,929,877 | B2* | 1/2015 | Rhoads | | G06F 17/30241 |
| | | | | | 455/420 |
| 8,930,472 | B2* | 1/2015 | Leacock | | G06Q 10/10 |
| | | | | | 709/206 |
| 9,452,938 | B2* | 9/2016 | Orentlicher | | C01C 1/242 |
| 9,483,730 | B2* | 11/2016 | Di Fabbrizio | | G06N 5/02 |
| 9,565,512 | B2* | 2/2017 | Rhoads | | G06F 17/30241 |
| 9,594,791 | B2* | 3/2017 | Bell | | G06Q 30/0282 |
| 2009/0024546 | A1* | 1/2009 | Ficcaglia | | G06F 17/30867 |
| | | | | | 706/12 |
| 2016/0012342 | A1* | 1/2016 | Simon | | G06Q 10/00 |
| | | | | | 706/52 |

OTHER PUBLICATIONS

Developing a Real-Time System for Measuring the Consumption of Seasoning Mayumi Ueda; Takuya Funatomi; Atsushi Hashimoto; Takahiro Watanabe; Michihiko Minoh 2011 IEEE International Symposium on Multimedia Year: 2011 pp. 393-398, DOI: 10.1109/ISM.2011.71 IEEE Conference Publications.*

Joining Case-Based Reasoning and Item-Based Collaborative Filtering in Recommender Systems SongJie Gong 2009 Second International Symposium on Electronic Commerce and Security Year: 2009, vol. 1 pp. 40-42, DOI: 10.1109/ISECS.2009.172 IEEE Conference Publications.*

FTM: Recommending the Right Items for User Temporal Interests with Matrix Factorization through Topic Model Yanmin Shang; Kefu Xu; Yi Han; Chuang Zhang 2016 IEEE First International Conference on Data Science in Cyberspace (DSC) Year: 2016 pp. 189-198, DOI: 10.1109/DSC.2016.20 IEEE Conference Publications.*

Selecting influential and trustworthy neighbors for collaborative filtering recommender systems Ziyang Zhang; Yuhong Liu; Zhigang Jin; Rui Zhang 2017 IEEE 7th Annual Computing and Communication Workshop and Conference (CCWC) Year: 2017 pp. 1-7, DOI: 10.1109/CCWC.2017.7868421 IEEE Conference Publications.*

SPORE: A sequential personalized spatial item recommender system Weiqing Wang; Hongzhi Yin; Shazia Sadiq; Ling Chen; Min Xie; Xiaofang Zhou 2016 IEEE 32nd International Conference on Data Engineering (ICDE) Year: 2016 pp. 954-965, DOI: 10.1109/ICDE.2016.7498304 IEEE Conference Publications.*

Hidden Conditional Random Fields with Deep User Embeddings for Ad Targeting Nemanja Djuric; Vladan Radosavljevic; Mihajlo Grbovic; Narayan Bhamidipati 2014 IEEE International Conference on Data Mining Year: 2014 pp. 779-784, DOI: 10.1109/ICDM.2014.150 IEEE Conference Publications.*

"Case 2:16-cv-01225-RWS-RSP, Civil Cover Sheet filed Nov. 3, 2016", (Nov. 3, 2016), 2 pgs.

"Case 2:16-cv-01225-RWS-RSP, Final Judgment filed Dec. 21, 2016", (Dec. 21, 2016), 1 pg.

"Case 2:16-cv-01225-RWS-RSP, Jury Trial Demanded and Complaint for Patent Infringement, filed Nov. 3, 2016", (Nov. 3, 2016), 14 pgs.

"Case 2:16-cv-01225-RWS-RSP, Jury Trial Demanded and Corporate Disclosure Statement filed Nov. 3, 2016", (Nov. 3, 2016), 1 pg.

"Case 2:16-cv-01225-RWS-RSP, Motion to Dismiss with Prejudice filed Dec. 21, 2016", (Dec. 21, 2016), 2 pgs.

"Case 2:16-cv-01225-RWS-RSP, Order filed Jan. 19, 2017", (Jan. 19, 2017), 1 pg.

"Case 2:16-cv-01225-RWS-RSP, Proposed Order filed Dec. 21, 2016", (Dec. 21, 2016), 2 pgs.

"Case 2:16-cv-01225-RWS-RSP, Referral Order RS-72-1, Document 4 filed Nov. 3, 2016", (Nov. 3, 2016), 2 pgs.

"Case 2:16-cv-01225-RWS-RSP, Report on the Filing or Determination of an Action Regarding a Patent or Trademark filed Jan. 29, 2017", (Jan. 19, 2017), 1 pg.

"Case 2:16-cv-01225-RWS-RSP, Report on the Filing or Determination of an Action Regarding a Patent or Trademark filed Nov. 3, 2016", (Nov. 3, 2016), 1 pg.

"Case 2:16-cv-01225-RWS-RSP, Summons in a Civil Action filed Nov. 3, 2016", (Nov. 3, 2016), 2 pgs.

"Case 2:16-cv-01225-RWS-RSP, Summons in a Civil Action filed Nov. 9, 2016", (Nov. 9, 2016), 2 pgs.

"Case 2:16-cv-01225-RWS-RSP, Unopposed Application for Extension of Time to Answer Complaint filed Nov. 23, 2016", (Nov. 23, 2016), 1 pg.

* cited by examiner

```
CREATE TABLE 'FoodCorrelations' (
   'addedId' int(11) NOT NULL AUTO_INCREMENT,
   'foodUuid1' binary(16) NOT NULL,
   'foodUuid2' binary(16) NOT NULL,
   'occurences' int(11) NOT NULL,
   'cond_prob_food1' float NOT NULL,
   'cond_prob_food2' float NOT NULL,
   PRIMARY KEY ('addedId'),
   UNIQUE KEY 'uuid1_uuid2' ('foodUuid1' , 'foodUuid2')
) ENGINE=InnoDB AUTO_INCREMENT=1 DEFAULT CHARSET=utf8 COLLATE=utf8_bin;
```

*FIG. 6A*

```
SELECT U.correlatedUuid, SUM(U.occurences) AS occurences FROM (
    SELECT FC.foodUuid2 AS 'correlatedUuid' ,
           FC.occurences
      FROM FoodCorrelations FC
     WHERE FC.foodUuid1 IN (<LOGGED_FOOD_UUID>)
       AND FC.foodUuid2 NOT IN (<LOGGED_FOOD_UUID>)
  UNION
    SELECT FC.foodUuid1 AS 'correlatedUuid' ,
           FC.occurences
      FROM FoodCorrelations FC
     WHERE FC.foodUuid2 IN (<LOGGED_FOOD_UUID>)
       AND FC.foodUuid1 NOT IN (<LOGGED_FOOD_UUID>)

) U
GROUP BY U.correlatedUuid
ORDER BY SUM(U.occurences) desc
    LIMIT 50
```

*FIG. 6B*

PREDICTIVE FOOD LOGGING

TECHNICAL FIELD

The present disclosure generally relates to the field of operator interfaces and, in one specific example, to incorporating predictive food logging into a graphical user interface for tracking.

BACKGROUND

Diet tracking (or food diary tracking) software applications may allow users to enter information pertaining to foods the users have consumed. The user interfaces of such diet tracking applications may be presented on a mobile device (e.g., an iOS or an Android device) of the users.

BRIEF DESCRIPTION OF THE DRAWINGS

FIG. 6A is a code listing illustrating an example database schema that captures a probability that a second food will be logged given that a first food has been logged and vice versa.

FIG. 6B is a code listing illustrating an example database query that ranks food items that a user might log in order from most likely to least likely.

DETAILED DESCRIPTION

Figure 1:
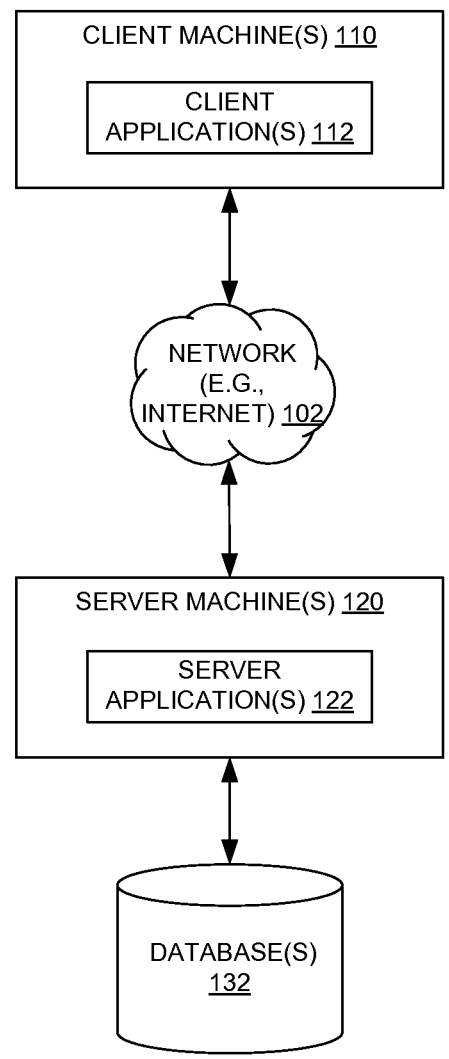
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

In various embodiments, a method of predicting food items consumed by a target user of a food-logging application is disclosed. Loggings of consumptions of food items are received (e.g., from the target user, other users, or third-party systems). The loggings are associated with one or more data items. Examples of such data items may include identification data items (e.g., names of the food items or a quantities of the food item consumed), location data items, timing data items, personal data items, commercial data items, and so on (as described in more detail below). The data items may be received from various sources, including the users themselves, systems having information about the users (e.g., third-party transaction systems, such as billing systems associated with an establishment in which users make purchases), applications executing on the devices of the users, and so on.

A predictive model is generated based on the received loggings. The predictive model may predict one or more additional food items that a user will consume or is likely to have consumed (e.g., at a particular time). In various embodiments, the prediction is based on one or more additional data items received pertaining to the user. Examples of such additional data items may include location data items, timing data items, personal data items, commercial data items, a history of one or more loggings of food item consumptions by the user, a history of one or more loggings of food item consumptions by other users, and so on. Thus, in various embodiments, the prediction is generated based on an application of the predictive model (e.g., generated based on histories of loggings of a particular users, histories of loggings of multiple users, or both) to one or more additional data items (e.g., data items streaming into the system in real time from a current user or other users that may be relevant to food consumptions by the user). The prediction of the consumption of the additional food item by the user may then be communicated for presentation to the user in a user interface.

In various embodiments, a method of reducing an amount of effort required of a user to consistently log consumptions of food items is disclosed. The method predicts what the user has consumed or will consume next, making it easier for the user to log the consumption. In fact, in some embodiments, the user can log the consumption with no effort at all. In various embodiments, the prediction is generated by a predictive system based on a plurality of data items pertaining to a plurality of consumptions of food items by a plurality of users of a food-logging application. In various embodiments, the predictive system is tested, trained, or modified based on an assessment of accuracies of predictions made. The predictive system may also be trained or modified based on additional data items pertaining to additional consumptions of food items by the users.

These methods and the various embodiments disclosed herein may be implemented as a computer system having one or more modules (e.g., hardware modules or software modules). These methods and the various embodiments disclosed herein may be embodied as instructions stored on a machine-readable medium that, when executed by a processor, cause the processor to perform operations pertaining to the methods.

FIG. 1 is a network diagram depicting a system 100 (e.g., a wellness system), within which various example embodiments may be deployed. The system 100 includes server machine(s) 120. Server application(s) 122 in the server machine(s) 120 may provide server-side functionality (e.g., via a network 102) to one or more client application(s) 112 executing on one or more client machine(s) 110. Examples of the client machine(s) 110 may include mobile devices, including wearable computing devices. A mobile device may be any device that is portable or capable of being carried. Examples of mobile devices include a laptop computer, a tablet computer (e.g., an iPad), a mobile or smart phone (e.g., an iPhone), and so on. A wearable computing device may be any computing device that may be worn by a user. Examples of wearable computing devices include a smartwatch (e.g., a Pebble E-Paper Watch), an augmented reality head-mounted display (e.g., Google Glass), and so on. Such devices may use natural language recognition to support hands-free operation by a user.

In various embodiments, the client application(s) 112 may include a web browser (e.g., a browser, such as the Internet Explorer browser developed by Microsoft Corporation of Redmond, Wash.), a native application (e.g., an application supported by an operating system of the device (e.g., one of client machine(s) 110), such as Android, Windows, or iOS), or other application. Each of the one or more client machine (s) 110 may include a module (e.g., a plug-in, add-in, or macro) that adds a specific service or feature to a larger system. In various embodiments, the network 102 includes one or more of the Internet, a Wide Area Network (WAN), or a Local Area Network (LAN).

Although not shown in FIG. 1, the server application(s) 122 may include an API server or a web server configured to provide programmatic and web interfaces, respectively, to one or more application servers. The application servers may host the one or more server application(s) 122. Additionally, the application server may, in turn, be coupled to one or more data services or database servers that facilitate access to one or more databases, NoSQL. or non-relational data stores. Such databases or data stores may include database(s) 132 In various embodiments, the database(s) 130 include information provided by users of the wellness system or otherwise determined about users of the wellness system.

Such information may include information about meals users have eaten (e.g., based on logging of the meals by the users), unstructured interactions of the users with other users (e.g., in a support-group context), structured interactions of the users with other users (e.g., how many "high fives" a person has given or received), how consistently users have engaged in good habit-forming behaviors (e.g., how many meals in a row users have logged or how many meals users have logged today), attributes of the users (e.g., gender, age, height, weight, and so on), goals of the user (e.g., weight loss goals based on a starting weight and a target weight), preferences of the users (e.g., types of support groups the users are interested in joining or whether the users are interested in becoming facilitators of support groups), contact information (e.g., email addresses, home addresses, phone numbers, and so on), information users wish to share with other users, and so on.

The server application(s) 122 may provide a number of functions and services to users who access the server machine(s) 120. While the server application(s) 122 are shown in FIG. 1 to be included on the server machine(s) 120, in alternative embodiments, the server application(s) 210 may form part of a service that is separate and distinct from the server machine(s) 120.

Further, while the system 100 shown in FIG. 1 employs a client-server architecture, various embodiments are, of course, not limited to such an architecture, and could equally well find application in a distributed or peer-to-peer architecture system, for example. The various applications could also be implemented as standalone software programs, which do not necessarily have computer networking capabilities. Additionally, although not shown in FIG. 1, it will be readily apparent to one skilled in the art that client machine(s) 110 and server machine(s) 120 may be coupled to multiple additional networked systems.

Figure 2A:
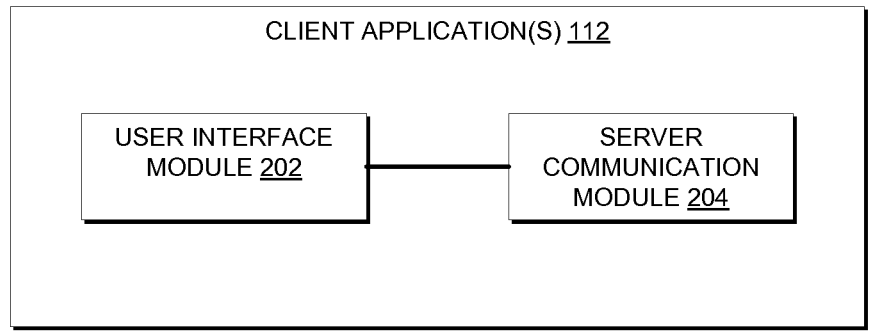
FIG. 2A is a block diagram illustrating example modules of the client application(s) 112.

FIG. 2A is a block diagram illustrating example modules of the client application(s) 112. A user interface module 202 may be configured to present a user interface on the client machine 110 of the user, such as a mobile device. For example, the user interface module 202 may be configured to present any of the user interface screens depicted in FIGS. 7-9. A server communication module 204 may be configured to send communications to and receive communications from the server application(s) 122.

Figure 2B:
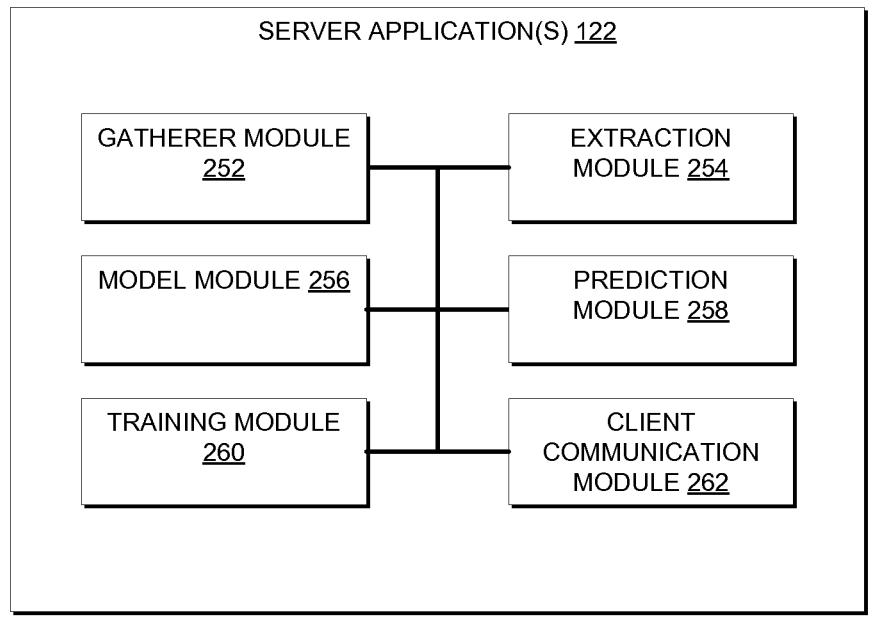
FIG. 2B is a block diagram illustrating example modules of the server application(s) 122 of FIG. 1.

FIG. 2B is a block diagram illustrating example modules of the server application(s) 122 of FIG. 1. A gatherer module 252 may be configured to gather information pertaining to loggings of food consumptions by users of the client application(s) 112. An extraction module 254 may be configured to identify particular features of the gathered information as being particularly relevant for predictive food items that the users may consume in the future. A model module 256 may be configured to analyze the gathered information to generate a model for predicting food items that a user has consumed or will consume. A prediction module 258 may be configured to apply the generated model to one or more additional received data items in order to predict likelihoods that a user has consumed or will consume particular food items. A training module 260 may be configured to modify the generated model based on further data received or improvements to predictive scores based on applying the predictive model to test sets and comparing the results to result sets repeatedly and iteratively (e.g., in an offline environment), as will be described in more detail below. A communication module 262 may be configured to communicate predicted food items to the client application(s) 112 for presentation to the user.

Figure 3:
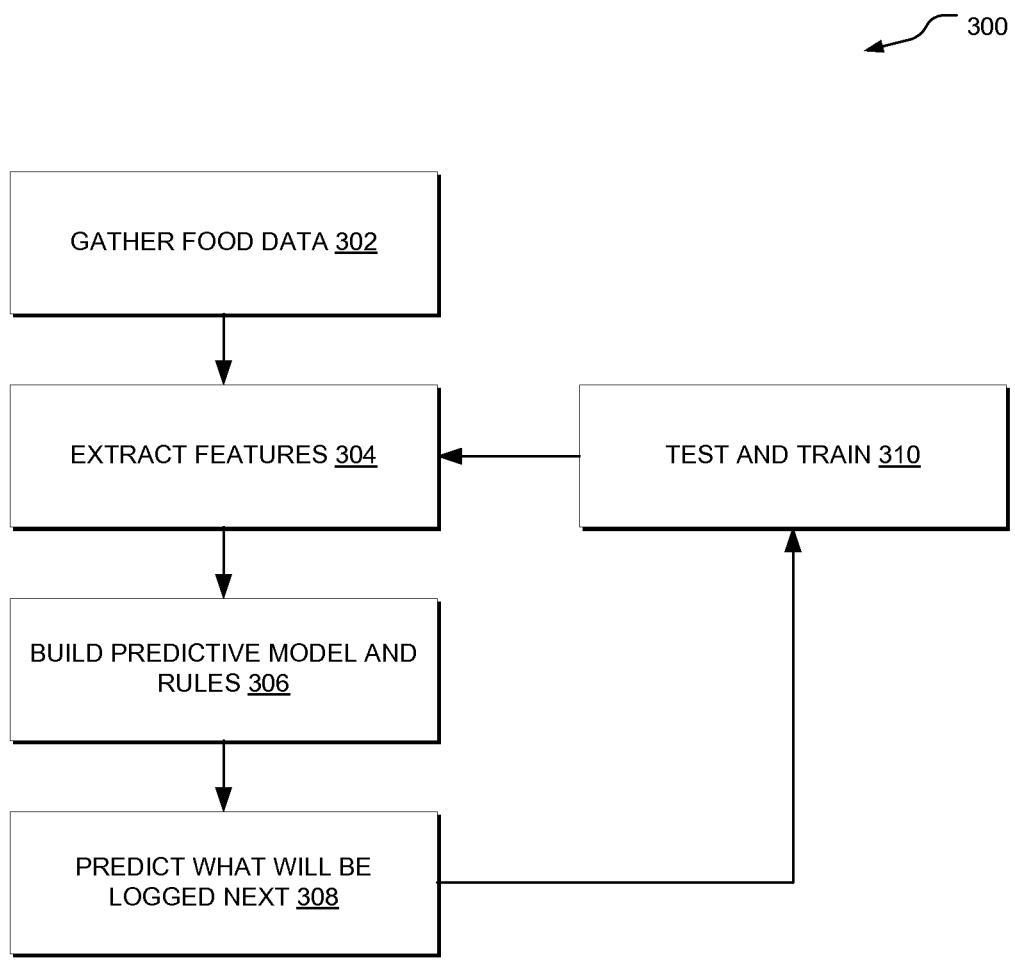
FIG. 3 is a flowchart illustrating example operations of a method of optimizing a user interface for food logging.

FIG. 3 is a flowchart illustrating example operations of a method 300 of optimizing a user interface for food logging. In various embodiments, the method 300 may be implemented by one or more modules of the client application(s) 112 or the server application(s) 122.

At operation 302, the gatherer module 252 may gather data items pertaining to consumptions of food items by users of a food-logging application. Such data items may include identifications of food items that were consumed; portion sizes of the consumed food items; when the food items were consumed (e.g., time of day or date); during which meals the food items were consumed (e.g., breakfast, lunch, dinner, or snack); where the food items were consumed (e.g., locations of the users when they logged their food consumptions); personal data pertaining to the food consumptions (e.g., weight or BMI of the users); commercial data (e.g., what the users or others in the users' households purchased in a supermarket or at a restaurant); demographic data (e.g., ethnic background or family status of the users); global events, dates, and environmental factors (e.g., information gathered from an external database of major events, including time and place of each major event); and so on.

For example, a user of the food-logging application may log a consumption of a food item. The user may provide an identification of the food item consumed. The user may also specify a portion size of the food item. Additional data items pertaining to the consumption of the food item may be collected from the user or other sources. For example, location data (e.g., based on satellite positioning data transmitted from a device of the user or data collected from systems configured to identify information pertaining to the location of the user may be collected and associated with the logging of the consumption of the food item. Alternatively, a date and time of day of the logging of the food item may be determined (e.g., by the client application(s) 112).

In various embodiments, a large amount of raw data pertaining to consumption of food items by the users of the food-logging application are collected. The raw data may be gathered from the users themselves and from other data sources (e.g., social data pertaining to the users, calendars of holidays, the users' devices).

At operation 304, the extraction module 254 may extract features from a stream of data items gathered pertaining to consumptions of the food items by users of the food-logging application. Here, features are types of data items that are isolated as being particularly relevant for predictive purposes. For example, a feature may be a type of data item associated with a consumption of a first food item by a user that predicts (e.g., with a certain probability that transgresses a threshold) a consumption of a second food item by the user at a later time. In various embodiments, features are extracted from a stream of the data items pertaining to consumption of food items by the user as well as a stream of data items pertaining to consumption of food items by other users.

In various embodiments, features extracted from each data stream may include location data, timing (or "when") data, personal data, commercial data, and types of foods consumed.

The location data may be used to identify a specific venue (e.g., a particular restaurant, office, or single-family residence at a particular location) associated with a consumption of a food item. In various embodiments, this identification may be made based on location data combined with a venue database as a base layer (e.g., Google Maps, FourSquare, Open Street Map, etc.). In various embodiments, some additional venues (e.g., private residences, small offices, food courts, or picnic spots) that do not exist in the venue database may be identified for inclusion in an additional data set used to supplement the venue database. These additional venues may be identified based on, for example, a number of food consumption logs being associated with the additional venues, wherein the number exceeds a threshold number.

The location data may be used to identify a type of venue associated with a consumption of a food item. For example, venues may be categorized in different ways. For instance, a venue may be categorized as being another location of a restaurant chain. Alternatively, a venue may be categorized as a Greek restaurant (e.g., based on the venue having properties that are similar to previously identified Greek restaurants).

The location data may be used to identify a geographical region (e.g., a country, state, or city) associated with a consumption of a food item. For example, a country, state, or city may be extracted from GPS coordinates and information from a geographic database (e.g., Google Maps).

The timing data may be used to determine date and time data associated with a consumption of a food item. In various embodiments, the date and time associated with the consumption of the food item may be compared to significant dates and times, including day of the week, holidays, and seasons. In various embodiments, a predictive score pertaining to a strength of a prediction power may be determined from the date and time data. For example, particular food items may be consumed more often at particular times of the day, on particular days of the week, during a particular holiday, and so on. In another example, particular food items may be consumed more often on a user's birthday or a user's relative's birthday.

The personal data may include past behavior data. For example, the past behavior data may include an analysis of where a user is in his or her weight loss journey. A progress of the user in the journey may be suggestive of foods or calories that the user is likely to consume. The personal data may also include demographic data. For example, an ethnic background of an individual may be suggestive of preferences that the user has for particular food items.

The commercial data may include information pertaining to food items that have been purchased by or for the user for consumption. In example embodiments, commercial records or payment systems may be accessed to determine when and where food items were purchased. For example, a payment system, such as Google Wallet or Square, may indicate specific food items that were purchased in a transaction.

The types of food data may identify, for example, dishes that were consumed by the user that are likely to have leftovers that are likely to be consumed by the user in the future.

At operation 306, the prediction module 258 applies clustering, rule generation, and machine-learning methodologies to generate a predictive model. In various embodiments, the prediction module 258 uses previously collected data items pertaining to food consumptions to predict food items that a user has or will consume at a particular date or time.

In example embodiments, the prediction module 258 uses various techniques, such as a bigram model or deep belief network (DBN), to make predictions and develop rules to generalize the predictions. In various embodiments, a database schema, such as the database schema shown in FIG. 6A, may capture a probability that a second food will be logged by a user given that a first food has been logged by the user.

For example, in various embodiments, a sum of occurrences of each bigram is used to rank food items that a user may log in order from most likely to least likely, as shown in FIG. 6A and FIG. 6B.

The prediction module 258 evaluates the probability that certain foods will be logged next. For example, based on the feature of location data, the prediction module 258 may determine that it is likely that the user will log consumptions of certain foods. For instance, the prediction module 258 may determine a likelihood that a user will log consumptions of particular foods based on the user being at a specific venue (e.g., hot dogs at a stadium). In another instance, if the user is at a restaurant, the user may be more likely to log certain food items that are available at the restaurant (e.g., sushi at a Japanese restaurant). Further still, the prediction module 258 may determine that the user is more likely to consume food items that other users have consumed at the specific venue.

The prediction module 258 may also determine a likelihood that a user will log consumptions of certain foods based on the user being at a specific type of a venue. For example, if the user is at a McDonald's, regardless of the location of the McDonald's, the user may be more likely to log consumptions of items available at McDonald's. Alternatively, if the user is at a restaurant similar to McDonald's (e.g., Burger King), the user may be more likely to log consumptions of items available at restaurants similar to McDonald's. Further still, if the user is at a Greek restaurant, the user may be more likely to log a consumption of a Greek salad.

The prediction module 258 may also determine a likelihood that a user will log consumptions of certain foods based on the user being in (or recently being in) a certain geographical region (e.g., country, state, city, or neighborhood). For example, a user may be more likely to log consumptions of sausages if the user is in Germany. In another example, a user may be more likely to log consumptions of toasted ravioli if the user is in St. Louis. Furthermore, a user may be more likely to log a peanut butter and jelly sandwich if the user is at home, or be more likely to log kimchi if the user is at workplace in which kimchi is often served.

The prediction module 258 may also determine a likelihood that a user will log consumptions of certain foods based on the feature of date and time data. For example, the prediction module 258 may determine that the user may be more likely to log consumptions of certain foods on a certain day of the week (e.g., it may be more likely that the user will eat brunch items on Sunday). In another example, the user may be more likely to log consumptions of certain foods at a certain time of the year or season (e.g., a user may be more likely to log turkey near Thanksgiving or a Starbucks Pumpkin Spice latte in the Fall). In a further example, the user may be more likely to log consumptions of certain foods on a certain time of day or day of week (e.g., a user may be more likely to log consumption of dinner foods at a time that is close to dinner time or a user may be more likely to log alcoholic beverages on a Friday night). Further still, the user may be more likely to log consumptions of certain food items on specific days (e.g., on a birthday of the user or person associated with the user, the user may be more likely to log consumption of cake).

The prediction module 258 may also determine a likelihood that a user will log consumptions of certain foods based on the feature of personal data. For example, the prediction module 258 may determine that it is more likely that the user will log consumptions of certain foods based on a point of a weight loss plan that the user is at, the BMI of the user, the calorie targets of the user, and so on. Alternatively, the user may be more likely to log certain foods based on demographics of the user (e.g., a user of Indian descent may be more likely to log Indian foods).

The prediction module 258 may also determine a likelihood that a user will log consumptions of certain foods based on types of foods previously consumed. For example, the prediction module 258 may determine that it is more likely that the user consume a certain type of food based on a determination that the type of food often results in leftovers. For instance, it may be more likely that a user will consume turkey and mashed potatoes for several days after Thanksgiving, or it may be more likely that the user will consume leftovers for several days of certain large dishes from certain restaurants.

In various embodiments, the prediction module 258 may use any combination of such determinations to rank likelihoods that users will log consumptions of particular foods at particular times. For example, the prediction module 258 may combine location data and personal data (e.g., the likelihood that a healthy person will log consumptions of particular foods at McDonald's versus the likelihood that an unhealthy person will log consumptions of particular foods at McDonald's).

At operation 308, the prediction module 258 predicts food items that the user is most likely to log a consumption of next. For example, based on the rules and predictive model described above, the system ranks food items according to a likelihood of consumption by the user. In various embodiments, the prediction module 258 not only predicts the food items themselves, but also quantities of each food item that the user is likely to consume, a number of food items, and a total calorie count of the food items.

In various embodiments, the prediction module 258 communicates the predictions for presentation to the user in a user interface. The predictions can be presented to the user in query-based or query-less scenarios. For example, in a query-based scenario, the user may input a keyword into a search box. Food items corresponding to the keyword may be identified and ranked according to a standard information retrieval (IR) identifying a strength of the correspondence between the keyword and the search results. The search results may then be combined with a predictive score for each food item as generated by the prediction module 258. For example, the standard IR score may be multiplied with the predictive score.

In a query-less scenario, the user may simply be presented with a list of food items that were most likely consumed by the user according to the results of the predictive model independent of any additional keywords input by the user.

At operation 310, the training module 260 may iteratively train the prediction module 258 to improve the accuracy of the predictions. For example, each time the system makes a correct prediction, it increases a predictive score representing a strength of a correlation between one or more particular data items (or features) and one or more particular food items.

In various embodiments, the prediction module 258 may be tuned with logged data. In various embodiments, the tuning may be done offline. For example, massive amounts of previously logged data may be split into a training set and a testing set. Data before time (t−1) may be made available to the system to attempt predictions of food items that will be logged at time t. Based on the accuracy of a prediction, a predictive score may be increased or decreased. For example, if one of the top three food items that the prediction module 258 predicted was an actual logged food item, the predictive score may be increased. Otherwise, the predictive score may be decreased. The iterations may continue from times t=0 (earliest user) to time t=now (latest data). The model may be iteratively turned (e.g., coefficients adjusted) to improve the predictive score. At the end of a training session, a similar process may be used to formally test the predictive model and record its latest performance. In various embodiments, tuning may also be done online as data items stream into the system.

Figure 4:
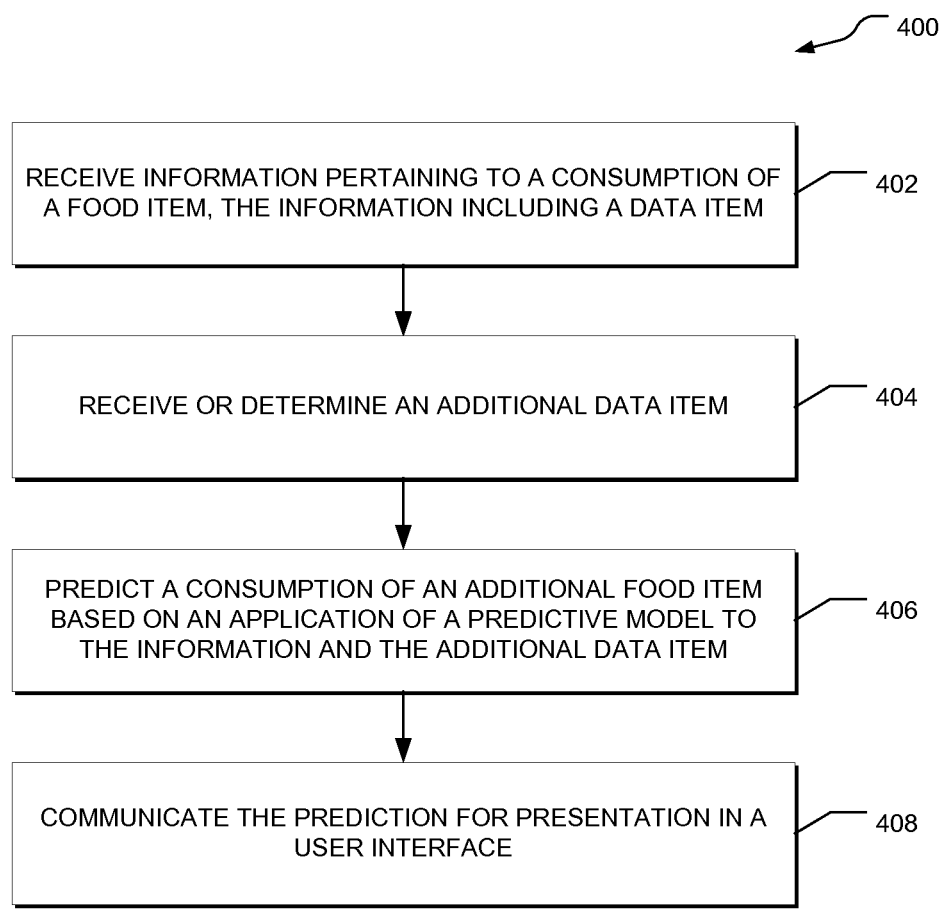
FIG. 4 is a flowchart of a method of communicating a prediction of a consumption of a food item for presentation in a user interface.

FIG. 4 is a flowchart of a method 400 of communicating a prediction of a consumption of a food item for presentation in a user interface. In various embodiments, the method 400 may be implemented by one or more modules of the client application(s) 112 or the server application(s) 122.

At operation 402, the gatherer module 252 receives information pertaining to a consumption of a food item. The information includes one or more data items, such as the name of the food item, the date or time at which the food item was consumed, the location at which the food item was consumed, and so on.

At operation 404, the gatherer module 252 receives or determines an additional data item. For example, GPS coordinates of a user may be received from a mobile device of the user. Alternatively, personal data pertaining to a progress of a user toward meeting a health goal is received. In yet another example, the gatherer module 252 may determine that a user's meal time is near.

At operation 406, the prediction module 258 predicts a consumption of an additional food item by a user based on an application of a predictive model to the information gathered pertaining to the consumption of the food item and the additional item. For example, based on receiving information that a user consumed turkey and mashed potatoes at a Thanksgiving dinner on a previous night (e.g., the data item received at operation 402), and further based on a determination that the user's next dinner time is approaching (e.g., the additional data item determined at operation 404), the prediction module 258 may apply the predictive model to the data item and the additional data item to determine that it is likely the user will consume or has consumed turkey and mashed potatoes.

At operation 408, the client-communication module 262 communicates the prediction for presentation in a user interface (e.g., on a mobile device of the user).

Figure 5:
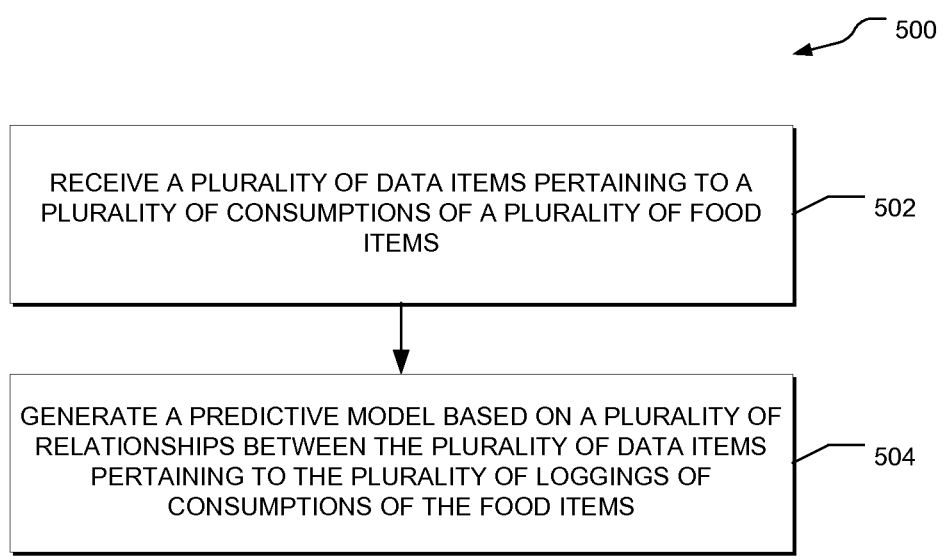
FIG. 5 is a flowchart of a method of generating a predictive model based on a plurality of relationships between a plurality of data items pertaining to a plurality of loggings of consumptions of a plurality of food items.

FIG. 5 is a flowchart of a method 500 of generating a predictive model based on a plurality of relationships between a plurality of data items pertaining to a plurality of loggings of consumptions of food items. In various embodiments, the method 500 may be implemented by one or more modules of the client application(s) 112 or the server application(s) 122.

At operation 502, the gatherer module 252 receives a plurality of data items pertaining to a plurality of consumptions of a plurality of food items (e.g., by a plurality of users of a food-logging application). These data items may include, for example, any of the data items described above with respect to FIG. 3.

At operation 504, the model module 256 generates a predictive model based on a plurality of relationships between the plurality of data items pertaining to the plurality of loggings of the consumptions of the food items. The generating of the predictive model may include, for example, generating predictive scores representing a likelihood that a particular food item will be consumed based on a value of the data item, as described above with respect to FIG. 3.

FIG. 6A is a code listing illustrating an example database schema 600 that captures a probability that a second food will be logged given that a first food has been logged and vice versa. In this example, the database scheme 600 is represented in mySQL Data Definition Language.

FIG. 6B is a code listing illustrating an example database query 650 that ranks food items that a user may log in order from most likely to least likely. In this example, the ranking is based on a sum of occurrences of bigrams corresponding to the food items.

Figure 7:
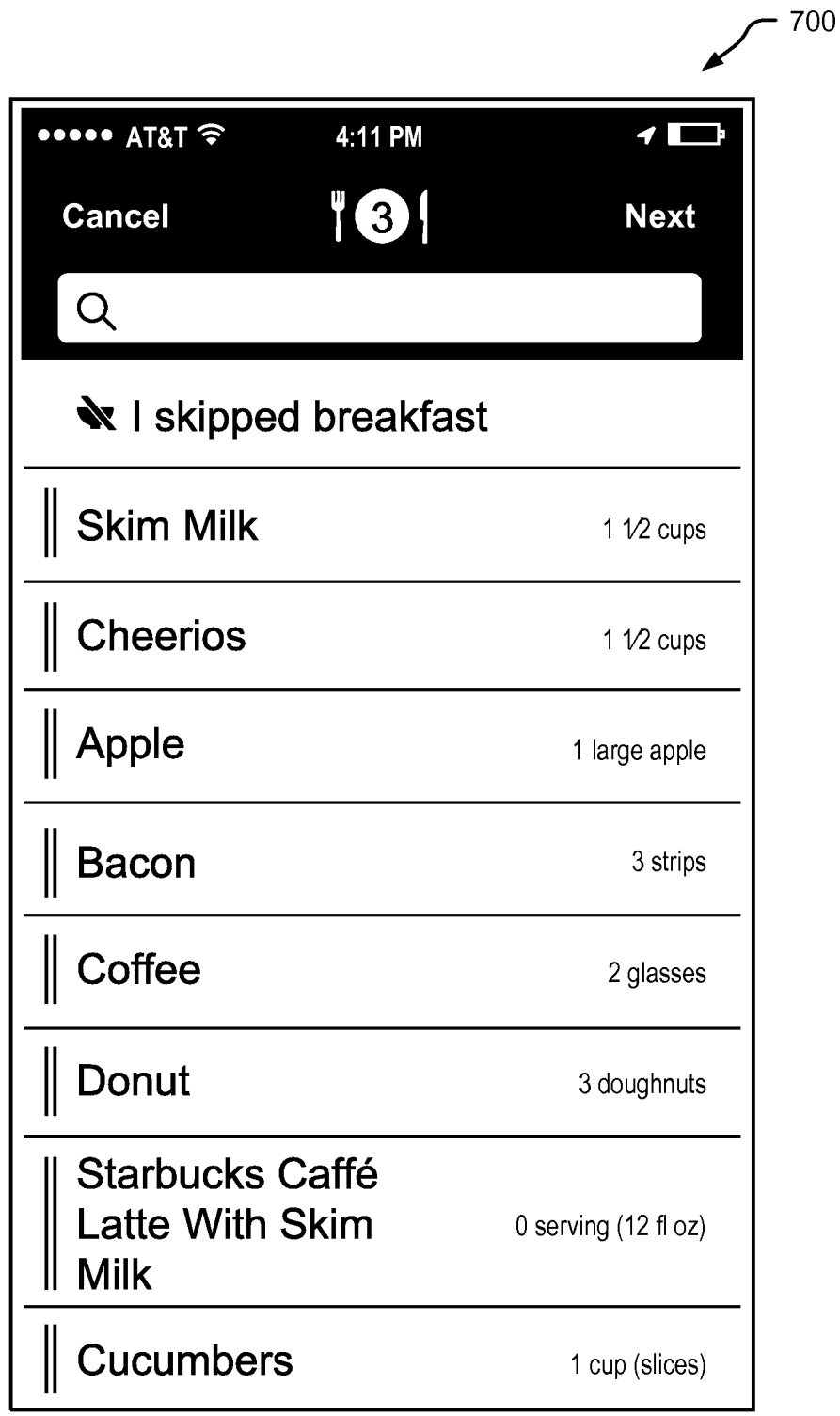
FIG. 7 is an example user interface for presenting food items that are predicted to be next food items that may be logged by the user.

FIG. 7 illustrates an example user interface 700 for presenting food items that are predicted to be the next food items that may be logged by the user. The user interface 700 may be presented at the user's request or proactively by the client application(s) 112. In various embodiments, portion sizes of each food item are presented along with the food item. Swiping may add the item, in the predicted portion size, to the user's food log. In one embodiment, selection of a food item does not move the user off of the user interface 700 of possible foods.

In various embodiments, the default quantity or portion size of a food item may be changed by the user before the user selects the food item as having been consumed. For example, the user may tap on the visual representation of the food item or on the "+"-sign next to the visual representation of the food item. Alternatively, if no default quantity for the food item is provided, the user may swipe the item. In response, one or more predicted portion options (e.g., ½ cup, 1 cup, 1½ cups) may then be presented (e.g., in line with the food item). In various embodiments, the predicted portion sizes are presented in order of predicted likelihood (e.g., based on an application of the predictive model to relevant data items pertaining consumption of the food item). The user may then select a portion with an additional tap.

Figure 8:
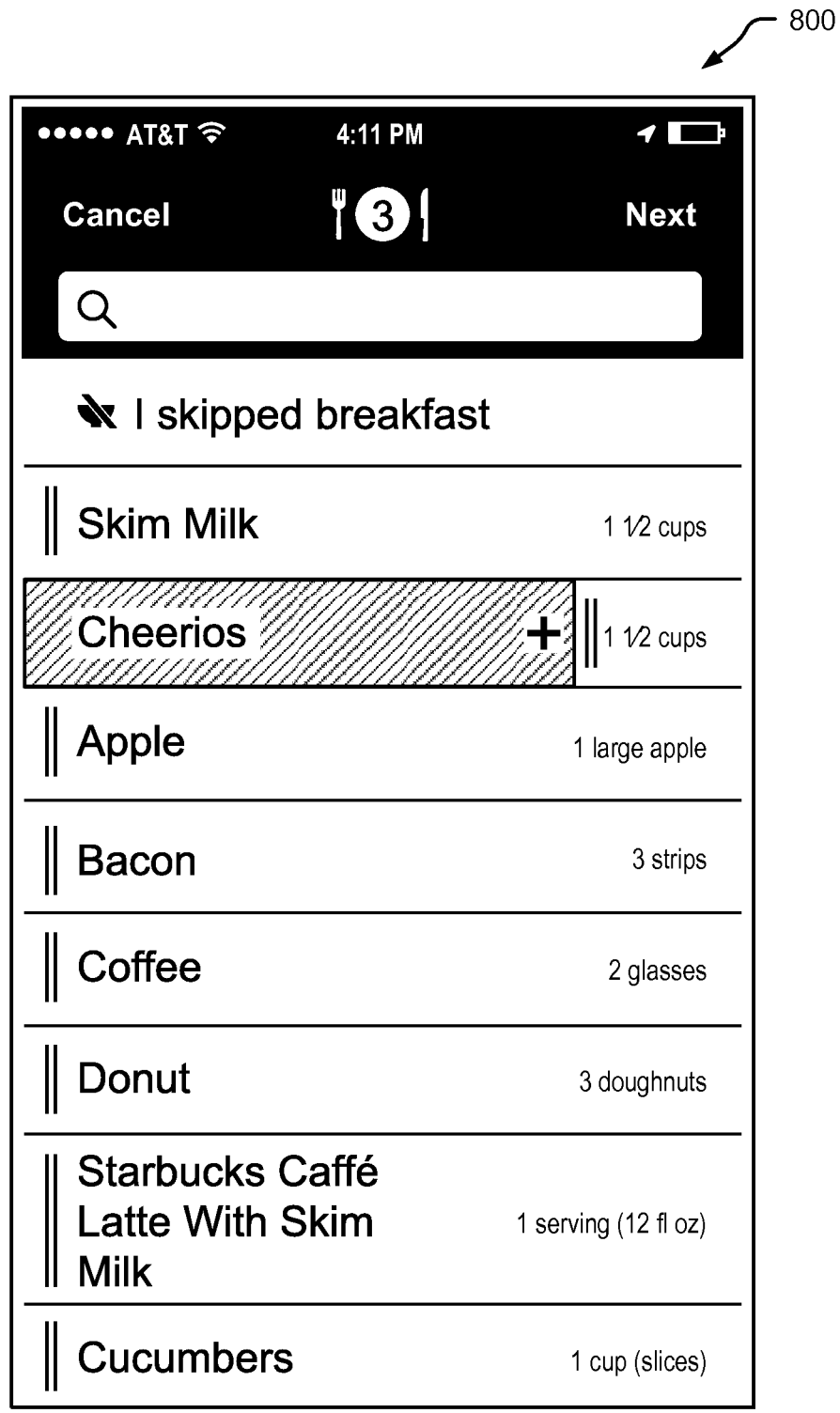
FIG. 8 is another example user interface for presenting food items that are predicted to be next food items that may be logged by the user.

FIG. 8 is another example user interface 800 for presenting food items that are predicted to be the next food items that may be logged by the user. In various embodiments, a selected food item (e.g., "Cheerios") is in the process of being highlighted by the user (e.g., by a swiping action on a touchscreen of a device of the user). Upon a complete swipe or dragging of the highlighted food item to the side, the food item is added to a list of food items that the user has logged (e.g., in the specified quantity).

Figure 9:
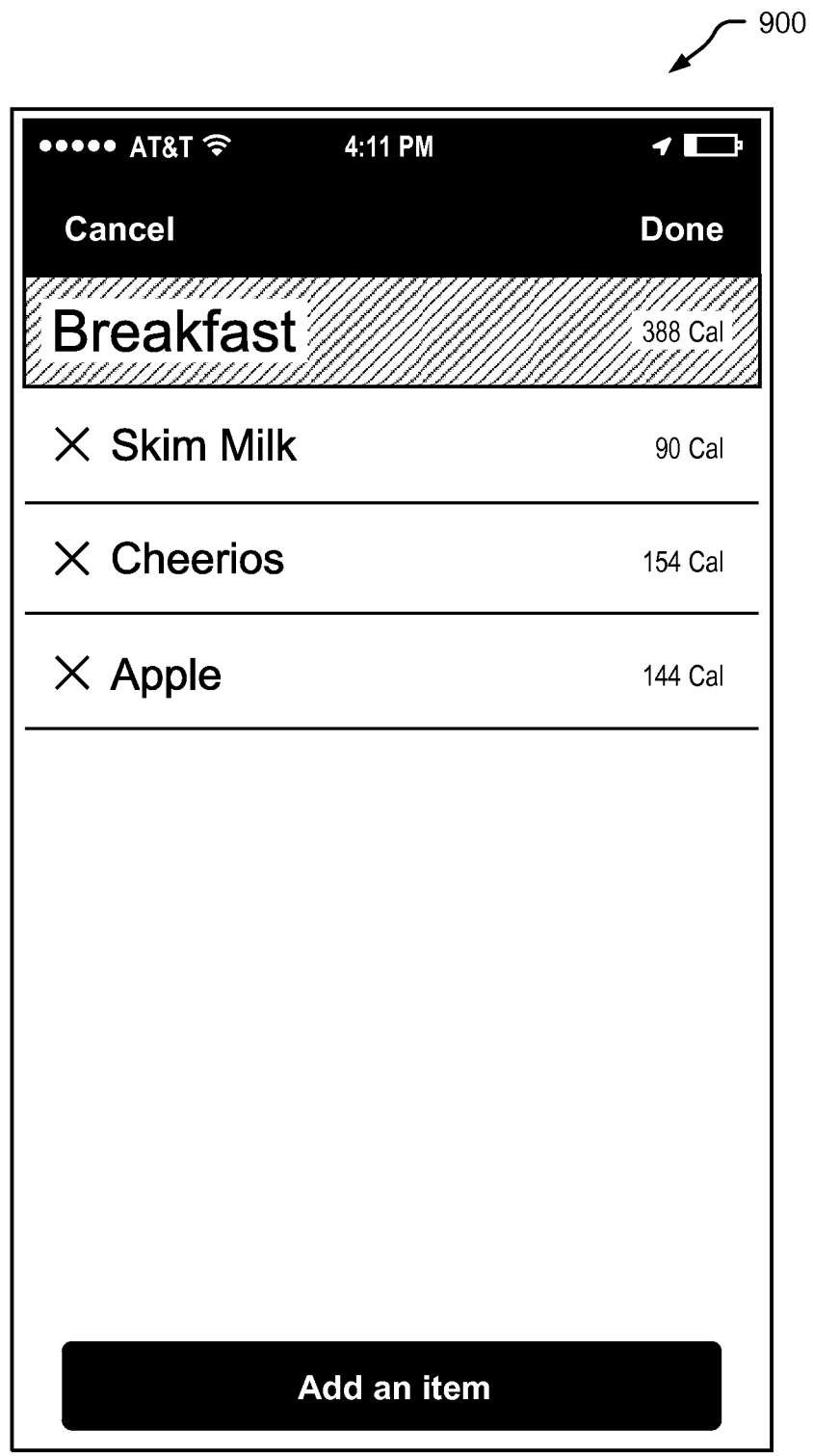
FIG. 9 is an example user interface for presenting food items that have been logged by a user.

FIG. 9 is a block diagram illustrating an example user interface 900 for presenting food items that have been logged by a user. In various embodiments, upon a selection of a food item, the food item is added to a list of logged food items. In various embodiments, a calorie total associated with the food item, as well as a total calorie count of calories consumed at a particular meal (e.g., breakfast) are also presented. In various embodiments, a user may delete items added to the list may be deleted by tapping on the "X" next to the food item.

In various embodiments, user interfaces may be presented for different types of logging, including automatic logging, lock screen logging, notification-based logging, and variable precision logging, as described below.

In various embodiments, if a user does not log a meal within a certain timeframe, the user's log can be updated automatically with a prediction of what they probably consumed. The user may be able to access a user interface to edit such automatically logged foods to make changes or corrections.

In various embodiments, a user may be able to log food consumption without opening an application on a mobile device (e.g., lock-screen logging). For example, on some devices, applications can present actions that a user can perform when the device is locked (e.g., before the user enters a passcode to access additional functionality on the device). Using this functionality, the user may be provided with an option to swipe left on the screen of the mobile device to log food consumption. For example, the user may be presented with multiple targets as separate selectable messages (e.g., "Log a small 300 cal breakfast," "log a medium 500 cal breakfast," "log a large 700 cal breakfast"; or "Log a coffee," "log a coffee and bagel," "log raisin bran and skim milk"). Swiping one of the messages would automatically log the identified food items without requiring the user to enter a passcode to unlock the device. The items selected for lock-screen logging may be a subset of those predicted by application of the predictive model to collected data items. Thus, for example, in the two hours around breakfast time, a subset (e.g., two) of the food items most likely to be logged at breakfast time in a relevant venue, in light of other predictive variables, may be presented. The user may also specify options (e.g., portion sizes) related to breakfast (e.g., as described above). The imagery could optionally be adjusted to remind the user of breakfast (e.g., pictures of breakfast foods, the sun rising).

In various embodiments, logging options may be simplified with notification-based logging. A user may receive a message (e.g., an SMS message or an email message) to which the user may reply or activate a link to log predicted food consumptions. The options presented via notification-based logging may be adjusted based on the user interface in which they are presented. For example, an SMS message may state "Reply 0 if you skipped breakfast, 1 if you had a small breakfast (0-300 calories), 2 if you had a medium breakfast (300-600) calories, 3 if you had a large breakfast (600+ calories). Alternatively, an email may state "Click <button 1> if you skipped breakfast, click <button 2> if you had a small breakfast, click <button 3> if you had a medium breakfast, and click <button 4> if you had a large breakfast."

In various embodiments, food logging options may present yes/no choices. For example, within an application, a user could log a meal based simply on whether they were over or under their calorie budget for that meal (e.g., "swipe left if you had this meal in the range of 0-500 calories, swipe right if 500+ calories.").

Within an application, the user may log a meal based on what calorie bucket the meal falls into (e.g., "tap <<here>> if you had a 0-400 calorie meal," "tap <<here>> if you had a 400-800 calorie meal," "tap <<here>> if you had an 800-1200 calorie meal," or "tap <<here>> if you had a 1200-1600 calorie meal.").

Thus, in addition to or alternative to predicting food items and quantities, the predictive model may generate predictions of buckets of calories or other preformed buckets.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 120) and via one or more appropriate interfaces (e.g., APIs).

Example embodiments may be implemented in digital electronic circuitry, or in computer hardware, firmware, software, or in combinations of them. Example embodiments may be implemented using a computer program product (e.g., a computer program tangibly embodied in an information carrier, in a machine-readable medium for execution by, or to control the operation of, data processing apparatus, such as, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 10:
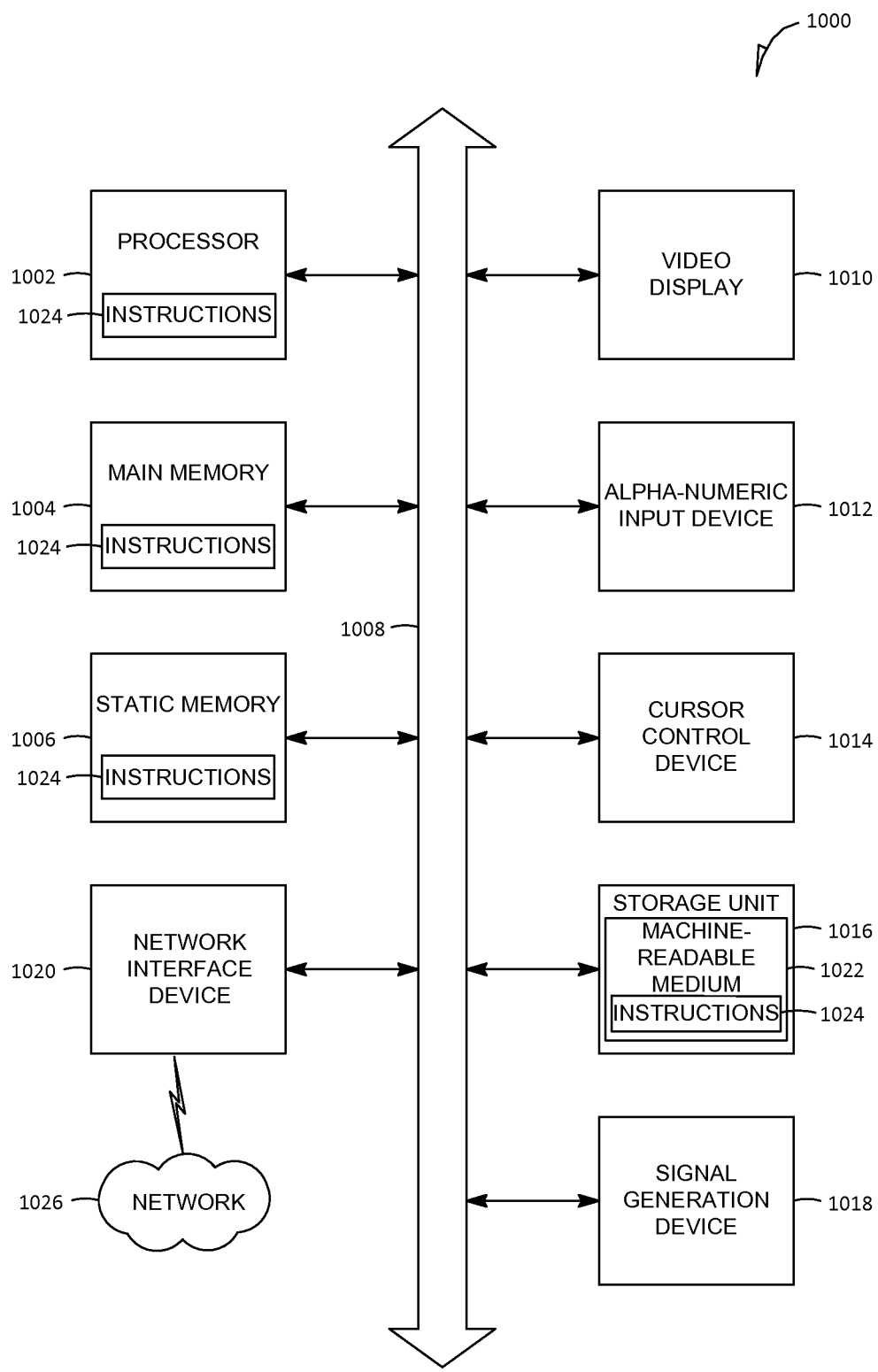
FIG. 10 is a block diagram of machine in the example form of a computer system within which instructions for causing the machine to perform any one or more of the methodologies discussed herein may be executed.

FIG. 10 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker), and a network interface device 1020.

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 120.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more modules implemented by one or more computer processors, the one or more modules configured to:
   receive a plurality of loggings pertaining to a plurality of consumptions of a plurality of food items by a plurality of users, the plurality of users including a target user;
   generate a predictive model based on an analysis of the plurality of loggings;
   receive a data item that is relevant to a consumption of an additional food item by the target user, the relevancy of the data item based on an association of a location of the user with a food venue and an association of the food venue with a type of food;
   generate a prediction pertaining to the consumption of the additional food item by the target user based on an application of the predictive model to the data item; and
   communicate the prediction for presentation on a device of the target user.

2. The system of claim 1, wherein the one or more modules are further configured to generate the predictive model based on a plurality of relationships between the plurality of consumptions of the plurality of food items and a plurality of data items corresponding to the plurality of consumptions.

3. The system of claim 1, wherein the prediction includes a probability of a likelihood of the consumption of the additional food item at a particular time by the target user.

4. The system of claim 1, wherein the prediction includes a likelihood of the consumption of the additional food item in a particular quantity by the target user.

5. The system of claim 1, wherein the one or more modules are further configured to perform the analysis of the plurality of loggings based on a one or more data items pertaining to the loggings, the one or more data items including one or more of a location data item, a timing data item, a personal data item, or a commercial data item.

6. The system of claim 1, wherein the presentation on the device of the target user includes presenting the prediction pertaining to the consumption of the additional food item in a user interface for selection by the target user as a consumed food item.

7. The system of claim 1, wherein the one or more modules are further configured to receive a notification of a selection by the target user of the additional food item as a consumed food item and update the predictive model based on the notification.

8. A method comprising:
   receiving a plurality of loggings pertaining to a plurality of consumptions of a plurality of food items by a plurality of users, the plurality of users including a target user;
   generating a predictive model based on an analysis of the plurality of loggings;
   receiving a data item that is relevant to a consumption of an additional food item by the target user, the relevancy of the data item based on an association of a location of the user with a food venue and an association of the food venue with a type of food;
   generating, using a hardware unit of a machine, a prediction pertaining to the consumption of the additional food item by the target user based on an application of the predictive model to the data item; and
   communicating the prediction for presentation on a device of the target user.

9. The method of claim 8, further comprising generating the predictive model based on a plurality of relationships between the plurality of consumptions of the plurality of food items and a plurality of data items corresponding to the plurality of consumptions.

10. The method of claim 8, wherein the prediction includes a probability of a likelihood of the consumption of the additional food item at a particular time by the target user.

11. The method of claim 8, wherein the prediction includes a likelihood of the consumption of the additional food item in a particular quantity by the target user.

12. The method of claim 8, further comprising performing the analysis of the plurality of loggings based on a one or more data items pertaining to the loggings, the one or more data items including one or more of a location data item, a timing data item, a personal data item, or a commercial data item.

13. The method of claim 8, wherein the presentation on the device of the target user includes presenting the prediction pertaining to the consumption of the additional food item in a user interface for selection by the target user as a consumed food item.

14. The method of claim 8, wherein the one or more modules are further configured to receive a notification of a selection by the target user of the additional food item as a consumed food item and updating the predictive model based on the notification.

15. A non-transitory machine readable storage medium storing a set of instructions that, when executed by at least one processor of a machine, cause the machine to perform operations comprising:
   receiving a plurality of loggings pertaining to a plurality of consumptions of a plurality of food items by a plurality of users, the plurality of users including a target user;
   generating a predictive model based on an analysis of the plurality of loggings;
   receiving a data item that is relevant to a consumption of an additional food item by the target user, the relevancy of the data item based on an association of a location of the user with a food venue and an association of the food venue with a type of food;
   generating, using a hardware unit of a machine, a prediction pertaining to the consumption of the additional food item by the target user based on an application of the predictive model to the data item; and communicate the prediction for presentation on a device of the target user.

16. The non-transitory machine readable storage medium of claim 15, further comprising generating the predictive model based on a plurality of relationships between the plurality of consumptions of the plurality of food items and a plurality of data items corresponding to the plurality of consumptions.

17. The non-transitory machine readable storage medium of claim 15, wherein the prediction includes a probability of a likelihood of the consumption of the additional food item at a particular time by the target user.

18. The non-transitory machine readable storage medium of claim 15, wherein the prediction includes a likelihood of the consumption of the additional food item in a particular quantity by the target user.

19. The non-transitory machine readable storage medium of claim 15, further comprising performing the analysis of the plurality of loggings based on a one or more data items pertaining to the loggings, the one or more data items including one or more of a location data item, a timing data item, a personal data item, or a commercial data item.

20. The non-transitory machine readable storage medium of claim 15, wherein the presentation on the device of the target user includes presenting the prediction pertaining to the consumption of the additional food item in a user interface for selection by the target user as a consumed food item.

* * * * *

UNITED STATES PATENT AND TRADEMARK OFFICE
CERTIFICATE OF CORRECTION

| | | |
|---|---|---|
| PATENT NO. | : 9,817,559 B2 | Page 1 of 1 |
| APPLICATION NO. | : 14/329594 | |
| DATED | : November 14, 2017 | |
| INVENTOR(S) | : Simon et al. | |

It is certified that error appears in the above-identified patent and that said Letters Patent is hereby corrected as shown below:

On the Title Page

In item (72), in "Inventors", in Column 1, Line 9, after "Mississauga", insert --, ON--

On page 2, in Column 2, under "Other Publications", Line 31, delete "Jan. 29," and insert --Jan. 19,-- therefor Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*